Jan. 6, 1953 D. P. FAULK 2,624,842

ELECTRONIC COUNTING CIRCUITS

Filed Nov. 5, 1947 2 SHEETS—SHEET 1

INVENTOR
DONALD P. FAULK
BY Elmer J. Gorn
ATTORNEY

ELECTRONIC COUNTING CIRCUITS

Filed Nov. 5, 1947 2 SHEETS—SHEET 2

INVENTOR
DONALD P. FAULK
BY Elmer J. Gorn
ATTORNEY

Patented Jan. 6, 1953

2,624,842

UNITED STATES PATENT OFFICE 2,624,842

ELECTRONIC COUNTING CIRCUITS

Donald P. Faulk, Waltham, Mass., assignor to Raytheon Manufacturing Company, Newton, Mass., a corporation of Delaware Application November 5, 1947, Serial No. 784,221

7 Claims. (Cl. 250—27)

This invention relates to electronic counting circuits, and more particularly to pulsation counting circuits for counting a predetermined number of voltage pulsations and thereafter effectuating a controlling operation.

An object of this invention is to devise a pulsation counting circuit which is adjustable to count a considerable range of pulsations, and is very accurate throughout said range.

Another object is to provide a pulsation counting circuit which will accurately count voltage pulsations even through such pulsations occur irregularly and the time intervals between them vary over a rather wide range.

A further object is to devise a pulsation counting circuit which is supplied from an alternating current line, but which is substantially independent of line voltage variations.

The foregoing and other objects of the invention will be best understood from the following description of an exemplification thereof, reference being had to the accompanying drawings, wherein.

Figure 1:
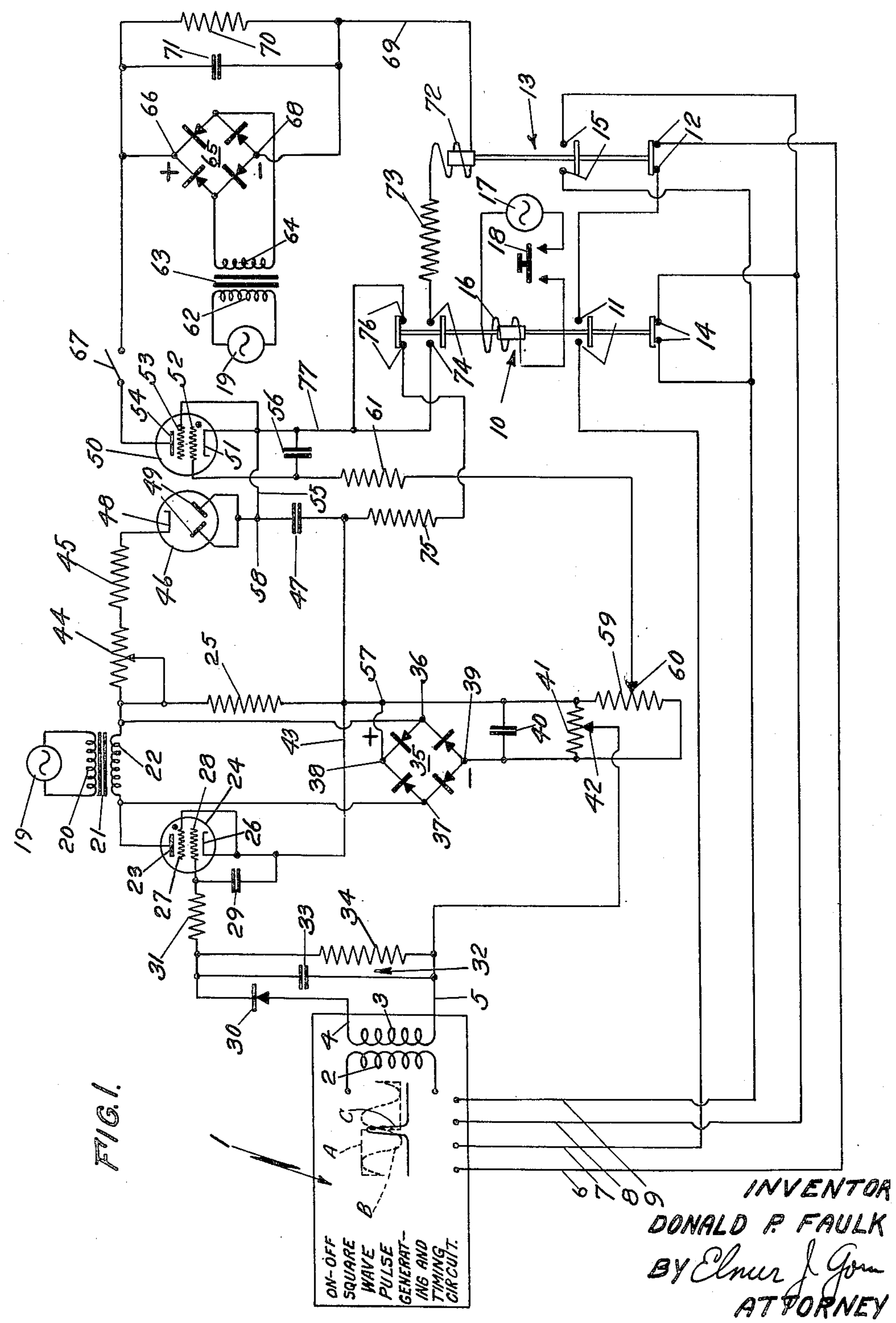
Fig. 1 is a diagram of a circuit embodying the invention.

Referring to Fig. 1, an on-off square wave pulse generating and timing circuit 1 produces a series of electrical pulsations in an output coil 2 thereof. These pulsations are to be counted by the circuit of this invention and circuit 1 is to be suitably controlled or operated upon after a variable predetermined number of pulsations are so counted. Circuit 1 may be, for example, a circuit such as that disclosed and claimed in my copending application, Serial No. 780,040, filed October 15, 1947, now Patent No. 2,460,816 dated February 9, 1949. As represented by the curves within block 1, such a circuit produces a square wave voltage output A having successive positive and negative loops, representing "on" times and "off" times, respectively, each such loop having a duration of a whole number of cycles of the alternating current line voltage B. The durations of these positive and negative loops are independently adjustable. As disclosed in said application, a voltage pulse C is produced, in a certain inductor of circuit 1, at the end of each positive loop or "on" time of output wave A; this inductor is shown as coil 2 in Fig. 1. Since the positive and negative loops of output wave A are independently adjustable in duration, the pulses C may recur at irregular and adjustable intervals.

Although circuit 1 is illustrated as a specific circuit, it should be clearly understood that the input of the counting circuit of this invention, instead of being provided by circuit 1, may be provided by any other suitable source of voltage pulsations of adjustable recurrence.

A coil 3 is inductively coupled to coil 2, in circuit 1, and the opposite ends of coil 3 are connected to leads 4 and 5 which serve as the input leads of the counting circuit of this invention. The input pulses C all have the same relative polarity, a polarity such that the pulses cause lead 4 to go positive with respect to lead 5.

Four control leads 6, 7, 8, and 9 are connected to circuit 1 to control the same, or in other words to energize and deenergize said circuit. As disclosed in my aforesaid copending application, such a circuit may be energized by closing a pair of normally-open relay contacts and opening a pair of normally-closed relay contacts. In Fig. 1, this is illustrated by a relay 10 having a pair of normally-open contacts 11 connected in series between leads 6 and 7 through the normally-closed contacts 12 of a second relay 13. The pair of normally-closed contacts 14 of relay 10 is connected across leads 8 and 9; also connected across said leads is a pair of normally-open contacts 15 of relay 13. When a circuit is completed between leads 6 and 7 and when the circuit between leads 8 and 9 is broken, circuit 1 is energized, while, when the circuit between leads 6 and 7 is broken and when a circuit is completed between leads 8 and 9, circuit 1 is deenergized.

Relay 13 is originally deenergized, as will be described hereinafter, so that contacts 12 are originally closed and contacts 15 are originally open. Relay 10 has an operating winding 16 which is connected to an alternating current source 17 in series with a switch 18. When switch 18 is closed, relay 10 is energized to close contacts 11 (completing a circuit between leads 6 and 7, since contacts 12 are closed) and to open contacts 14 (breaking a circuit between leads 8 and 9, since contacts 15 are open); circuit 1 is therefore energized to supply voltage pulsations to input leads 4 and 5 of the counting circuit.

A suitable source 19 of alternating current line voltage, which may, for example, be the same source as that energizing the circuit 1, supplies the primary 20 of a power transformer 21. One end of the secondary 22 of transformer 21 is connected to the anode 23 of a gas tetrode or thyratron 24, while the opposite end of said secondary is connected through a resistor 25 to the cathode lead 43 and cathode 26 of said thyratron. The shield grid 27 of thyratron 24 is connected directly to cathode 26, while control grid 28 thereof is coupled through a bypass condenser 29 to said cathode.

Lead 4 is connected, through a rectifier 30 and a resistor 31, to control grid 28; rectifier 30 is so poled as to pass positive impulses to said grid. A "memory circuit" 32 is provided, said circuit consisting of a condenser 33 and a resistor 34 connected in parallel between lead 5 and a point between rectifier 30 and resistor 31.

A bridge-type full-wave rectifier 35 has one pair of diagonally opposite terminals 36 and 37 connected across secondary winding 22, which therefore serves as an alternating current source for said rectifier. A filter condenser 40 is connected between the positive direct current output terminal 38 and the negative direct current output terminal 39 of the rectifier. A potentiometric resistor 41 having a movable tap 42 thereon is connected between terminals 38 and 39. In order to provide a negative direct current bias on the grid of tube 24, sufficient to hold it normally non-conductive, positive terminal 38 is connected to cathode lead 43 and the cathode 26 of tube 24, while tap 42 is connected to lead 5 and through resistors 34 and 31 to the grid 28 of said tube.

A series circuit, consisting of and adjustable resistor 44, a fixed resistor 45, a diode rectifier 46, and a condenser 47, in the order named, is connected across resistor 25, with the cathode 48 of rectifier 46 connected to one end of resistor 45 and the anodes 49 of said rectifier connected to one terminal 58 of condenser 47. The condenser 47 is intended to be the main timing condenser of the counting circuit. The lower terminal 57 of condenser 47 is connected to lead 43 and the positive terminal 38 of rectifier 35.

Condenser 47 is capable of being charged from winding 22 as the power source through tube 24, tube 46, and resistors 44 and 45, resistor 44 being adjustable to bring the circuit into final calibration. Tube 24 is normally held non-conductive by the direct voltage across resistor 41 between point 57 (connected to the positive terminal 38 and to cathode 26) and tap 42.

When circuit 1 is energized, a voltage pulse is applied to the grid 28 of tube 24, at the end of each "on" time of circuit 1, through the memory circuit 32. The input pulses are in such a direction as to make lead 4 positive with respect to lead 5, and such voltage pulses are applied to control grid 28 effectively in series with the voltage between point 57 and tap 42.

Figure 3:
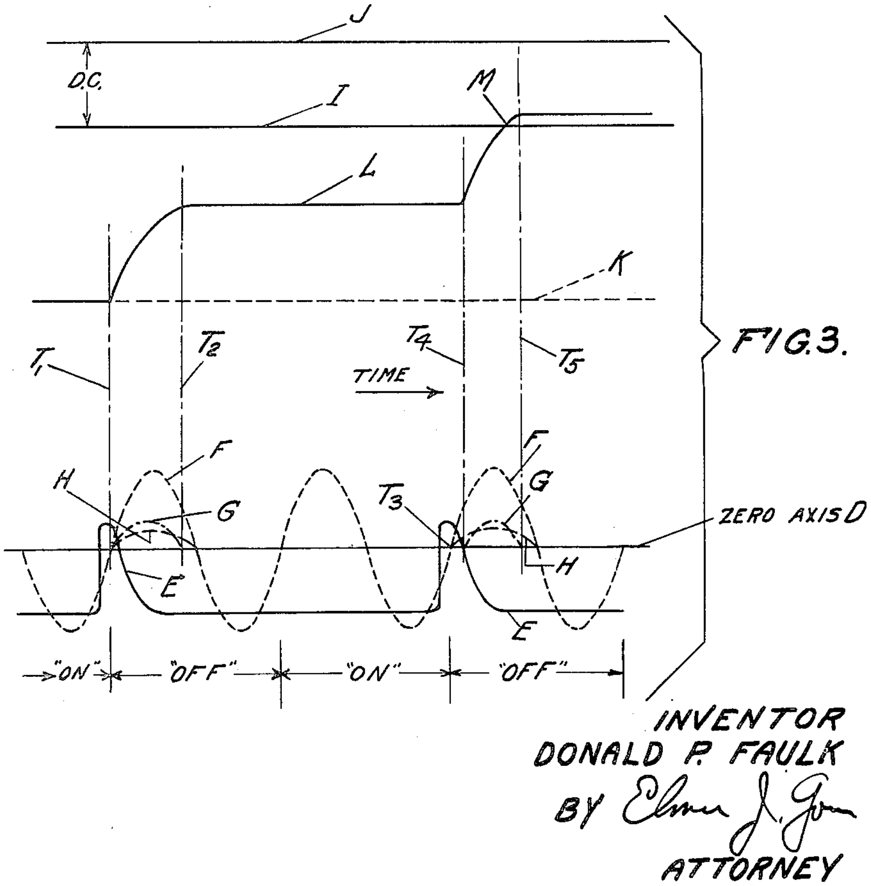
Fig. 3 is a set of curves illustrating the operation of the circuit.

In Fig. 3, the lower of the two sets of curves represents the voltages on tube 24. The zero axis D represents the potential of cathode 26 or point 57. The solid curve E represents the potential of control grid 28. It will be seen that, at the end of each "on" time, indicated by the legend in Fig. 3, a voltage impulse is applied to winding 3, each voltage impulse causing the resultant grid voltage E to go somewhat positive with respect to cathode voltage D.

Sinusoidal voltage wave F represents the alternating voltage applied to anode 23 by the alternating current secondary winding 22. Tube 24 becomes conductive at or near the voltage zero of voltage F, at time $T_1$, since grid voltage E is positive at this time, or is equal to or above the predetermined grid firing potential of tube 24. The so-called "memory circuit" 32 functions, in a conventional and well-known manner, to lengthen the positive pulse somewhat, in order to make sure that the grid voltage E is still above the firing potential of the tube at the time $T_1$, when the anode voltage F goes sufficiently positive with respect to the cathode of the tube to cause the tube 24 to conduct.

Condenser 47 is originally discharged, as will appear hereinafter. With winding 22 as the energy source, and tube 24 conductive, current flows for one-half cycle through the circuit including anode 23, cathode 26, lead 43, condenser 47, anodes 49, cathode 48, resistor 45 and resistor 44, partially charging condenser 47 with its lower terminal 57 positive with respect to its upper terminal 58. The current flow through this charging circuit is limited by resistors 44 and 45. The positive pulse supplied from circuit 1 is somewhat shorter in duration than a cycle of the alternating current F, so that, at the end of the first full cycle of plate voltage F on tube 24, the grid voltage E is substantially negative again and tube 24 does not again become conductive until the grid voltage again reaches the firing value. Tube 24, being a rectifier, does not conduct during negative half-cycles of plate voltage; tube 24 therefore goes out at the end of the first positive half-cycle of plate voltage F.

Since the charge on condenser 47 is of such polarity that terminal 57 becomes positive with respect to terminal 58, the voltage resulting from this charge is in the opposing direction to the voltage F of winding 22. Therefore, as the voltage F decreases, a point is reached, at time $T_2$, before the end of the positive half-cycle of voltage during which tube 24 conducts, at which the line voltage F is no longer sufficient to send charging current through condenser 47 in a direction in opposition to the opposing voltage built up by the charge on condenser 47.

Curve G represents the charging current flowing through condenser 47. This current drops to the axis D, which also represents zero current, at time $T_2$, as above explained.

At the end of the next "on" time of circuit 1, which for convenience is illustrated as being two cycles of voltage F later than the end of the first or preceding "on" time, a positive voltage pulse is again applied to control grid 28, as represented by curve E. The point of possible conduction of tube 24 would ordinarily tend to occur later in the half-cycle of positive voltage F with each succeding input pulse, since condenser 47 becomes charged with each succeeding pulse of charging current and since the charge on said condenser is in the opposing direction to the voltage of winding 22. Therefore, the effectively increasing negative voltage on the anode 23 with respect to cathode 26 could eventually reach a value such that said negative voltage would be held on the anode for the entire time during which grid voltage E is above the firing value; under these conditions, tube 24 would not be fired even though succeeding positive grid voltage impulses were received from circuit 1. In order to prevent this possibility, and in order to keep tube 24 conductive throughout the appropriate half-cycles of line voltage F, a resistor 25 is connected between anode 23 and cathode 26, in parallel with the series circuit of resistors 44 and 45, rectifier 46, and condenser 47. By means of resistor 25, the back voltage or opposing voltage of condenser 47 is in effect isolated from or shunted away from the anode and cathode of tube 24.

Current pulses H represent the current flowing through resistor 25. It will be seen that this current flows throughout the entire half-cycles of voltage during which tube 24 is conductive.

At time $T_3$, which is at or near a zero of voltage F, and which occurs during the second positive excursion of grid voltage E, tube 24 again becomes conductive, since current can immediately flow from source winding 22 through resistor 25 as soon as the voltage on anode 23 begins to go positive. As the voltage F of winding 22 rises, at time $T_4$ it becomes larger than the voltage present on condenser 29 resulting from the previous partial charging thereof, so that beginning at this time another pulse G of charging current begins to flow through the charging circuit 44, 45, 46 to further increase the charge on condenser 47. Charging current G again drops at a time $T_5$ before the end of the positive half-cycle of voltage F, this time $T_5$ preceding the end of the corresponding positive half-cycle of line voltage F by an interval slightly greater than that by which time $T_2$ precedes the end of its corresponding positive half-cycle of line voltage F, since condenser 47 has become charged to a higher voltage by the second pulse of charging current G.

Rectifier 46 serves to prevent the discharge of condenser 47 through resistors 25, 44, and 45 during the intervals between pulses G of charging current, so that between such pulses condenser 47 remains with the charge left thereon as a result of the preceding pulse of charging current G. Rectifier 46 is so poled as to allow pulses of current to flow therethrough in such a direction as to charge condenser 47 with terminal 57 positive with respect to terminal 59.

A second gas tetrode or thyratron 50, similar to thyratron 24, is provided, containing cathode 51, control grid 52, shield grid 53, and anode 54. The upper terminal 58 of condenser 47 is connected, by means of a lead 55, directly to cathode 51. Shield grid 53 is connected directly to cathode 51, while control grid 52 is coupled through a bypass condenser 56 to said cathode. A potentiometric resistor 59, having a movable or adjustable tap 60 thereon, is connected across the terminals 38 and 39 of direct current source 35. This resistor may be calibrated as shown in detail by Fig. 2 of the drawings to be hereinafter referred to. Tap 60 is connected through a resistor 61 to control grid 52 of tube 50 and, since terminal 58 of condenser 47 is connected to cathode 51 and terminal 57 of said condenser is also connected to terminal 38, it may be seen that the voltage across condenser 47 and the voltage selected on resistor 59 are connected in series in the grid-cathode circuit of tube 50. Tube 50 is therefore biased by a selected voltage on resistor 59 and by the charge on condenser 47; timing is achieved by balancing the charge voltage on condenser 47 against a direct voltage selected on resistor 59.

Originally, with condenser 47 discharged, a voltage negative with respect to cathode 51 is applied to grid 52, this voltage being that appearing across that portion of potentiometer 59 which is selected by moving tap 60 thereon, this potential being negative because positive terminal 57 of the rectifier 35 and of the potentiometer 59 is connected to cathode 51. As explained above, condenser 47 is charged by current pulsations G with a polarity such that terminal 57 thereof is positive with respect to terminal 58 thereof. Therefore, the charge voltage on said condenser is connected in series opposition to the voltage selected on resistor 59, and the bias voltage on grid 52 is the difference between these two voltages.

In order that the operating or output part of the circuit may work very fast, and in order that the final relay 13 may be held energized, thyratron 50 is energized by direct current. The source 19 of alternating current line voltage is connected to supply the primary 62 of a power transformer 63, the secondary 64 of which is connected to the opposite input terminals of a bridge-type full-wave rectifier 65. Positive rectifier output terminal 66 is connected through a manually-operable main switch 67 to the anode 54 of tube 50, while negative rectifier output terminal 68 is connected to a lead 69. A filtering network, consisting of a resistor 70 and a condenser 71 in parallel, is connected across the rectifier output terminals 66 and 68. Negative lead 69 is connected, through a series circuit consisting of operating winding 72 of relay 13, a resistor 73, and the normally-open back contacts 74 of relay 10, to cathode 51. Thus, it will be seen that, when switch 67 and contacts 74 are closed, the direct potential of source 65 is applied to the anode-cathode circuit of tube 50 and a circuit controllable by tube 50 is set up through winding 72 of relay 13.

A series discharge circuit is provided for condenser 47, traceable as follows: terminal 57, resistor 75, normally-closed back contacts 76 of relay 10, lead 77, lead 55, and terminal 58. Thus, when contacts 76 are closed, condenser 47 will discharge through resistor 75.

Assuming it is desired to utilize the circuit of this invention to count the impulses produced by circuit 1, main switch 67 is closed, removing the open-circuit between the anode 54 and positive terminal 66 of the power supply 65. Contacts 76 are originally closed, so that condenser 47 is completely discharged. Switch 18 is now closed to energize relay 10, opening contacts 14 and closing contacts 11 to energize pulse-producing circuit 1, as explained above. Switch 18 is maintained closed throughout the entire energization time of the system. Energization of relay 10 also closes contacts 74 and opens contacts 76, the closing of contacts 74 causing a direct voltage to be applied to the anode-cathode circuit of tube 50 and the opening of contacts 76 disconnecting the discharge resistor 75 from condenser 47, thus permitting said condenser to be charged. When pulses are applied to the counting circuit of the present invention by circuit 1, the condenser 47 charges in steps, one step to each pulse, as previously explained, point 57 going positive with respect to point 58. Referring again to Fig. 3, the upper set of curves in this figure represents the voltages applied to tube 50. The horizontal line I represents the zero line, the voltage of cathode 51, or the potential of point 58. The horizontal line J represents the direct voltage applied to anode 54 by source 65. The horizontal line K, partly dotted and partly solid, represents the fixed direct bias applied to grid 52 by means of potentiometer 59, this bias originally being a negative voltage when condenser 47 is discharged, as explained above.

The curve L represents the potential of tap 60, or the potential applied to grid 52. This voltage is the resultant or algebraic sum of two voltages connected in series opposition, these being the voltage of condenser 47 and the direct voltage selected on resistor 59. Since before time $T_1$ condenser 47 is discharged, during this time the potential of point 60 is the potential K of potentiometer 59.

Between the times $T_1$ and $T_2$, condenser 47 charges in response to the current pulse G, as explained above; this charging follows a curve. Since this condenser charge is in opposite sense to the direct voltage across potentiometer 59, the potential of point 60 goes up exponentially during this interval, as shown by curve L.

After time $T_2$, and before the beginning of the next charging current impulse at $T_4$, the voltage of condenser 47 remains fixed, because of the presence of rectifier 46 which does not allow said condenser to discharge, as does also the voltage supplied by source 35, so that the potential of point 60 (which is the algebraic sum of these two voltages) is constant between these two instants; curve L is therefore horizontal.

Between times $T_4$ and $T_5$, as described above, another pulse of charging current G flows through condenser 47, so that the voltage of point 60 (curve L) again rises along a curve, as shown. During this second charging, a point M may be reached where the voltage across condenser 47 is equal to, slightly less than, or slightly greater than, the voltage between points 60 and 57 on resistor 59, depending upon the characteristics of the tube used as tube 50. For convenience, this predetermined point is illustrated as being located where the voltage across said condenser is equal to the voltage between points 60 and 57, so that at this point the potential of tap 60 (the algebraic sum of these two voltages) is equal to zero or the potential I of cathode 51; in other words, at this point there is a zero bias on control grid 52.

Assuming that tube 50 has such characteristics that it conducts when its grid voltage is zero, at the time indicated by point M, tube 50 conducts, and current then flows through winding 72 of relay 13 and energizes said relay, since contacts 74 are now closed. Of course, if the predetermined grid firing voltage of tube 50 were different from zero, firing point M would be located at other places along curve L.

The energization of relay 13 closes contacts 15 and opens contacts 12, completing a circuit between leads 8 and 9 which was previously opened by contacts 14 and breaking the circuit between leads 6 and 7 which was previously made by contacts 11. By such control of the conditions between leads 6—9, circuit 1 is deenergized and the count is stopped.

Tube 50 remains conducting and relay 13 remains energized until the anode circuit of said tube is broken, since said tube is supplied from a direct current source. In order to deenergize the counting circuit and prepare it for the next operation, switch 18 is opened to deenergize relay 10, opening contacts 74 and closing contacts 76. The opening of contacts 74, which are in series with winding 72 and the anode-cathode circuit of tube 50, extinguishes tube 50 and deenergizes relay 13. The closing of contacts 76 completes the discharge circuit of condenser 47, so that said condenser discharges through resistor 75 in preparation for the next counting operation.

When condenser 47 is discharged, the negative voltage supplied by potentiometer 59 is again applied to control grid 52 of tube 50, so that, when contacts 74 are again closed by the reenergization of relay 10, tube 50 will remain non-conductive.

Even though relay 13 is now deenergized, the circuit 1 remains cut off because of opening of the contacts 11 (breaking the circuit between leads 6 and 7) and closing of the contacts 14 (completing a circuit between leads 8 and 9).

Figure 2:
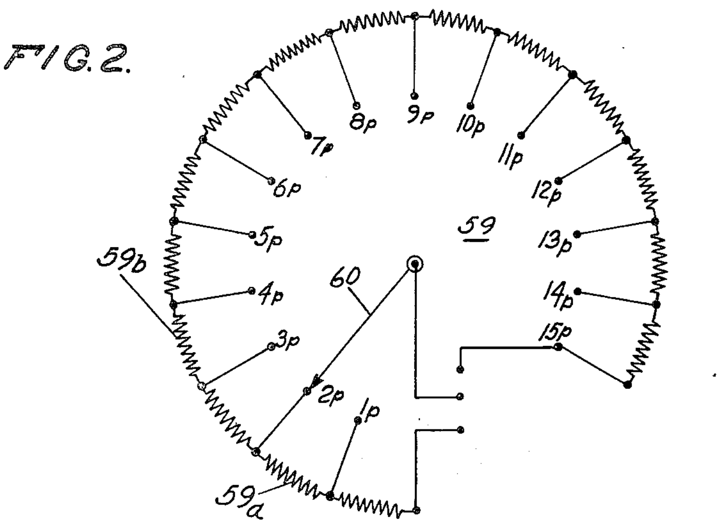
Fig. 2 is a detailed circuit arrangment for the adjustable resistor for predetermining the number of pulsations to be counted.

Fig. 2 is a detailed view of one form of adjustable resistor 59 having tapped sections 59*a*, *b*, etc. The selector switch arm or tap 60 is shown in the drawing to be set to a resistance tap corresponding to a calibrated amount of resistance sufficient to cause condenser 47 to charge to the predetermined magnitude for permitting thyratron 50 to conduct after a predetermined number of input pulses, here illustrated as two. Thus, the point M at which tube 50 fires occurs after two input pulses as shown. By varying the position of tap 60, the direct voltage selected, against which the charge on condenser 47 is balanced for timing, is also varied. Variation of this direct voltage means movement of line K up and down with respect to axis I, thus varying the condenser voltage necessary to reach point M, since point M corresponds to the resultant of the adjustable voltage and the condenser voltage. By properly calculating the values of resistance of each of the tapped sections 59*a*, etc., the condenser voltage necessary to reach point M (the grid firing voltage of the tube) may be made to correspond to a predetermined number of condenser charging impulses; therefore, adjustable resistor 59 may be calibrated, as illustrated, in numbers of pulsations to be counted.

By proper values of resistance of the tapped sections, for any type of tube 50, the point at which the grid firing voltage of the tube is reached may be made to fall within the time interval of charging corresponding to the number of pulsations to be counted, such as between $T_4$ and $T_5$ for the two-count adjustment illustrated.

Since the condenser 47 cannot discharge between the intervals during which it is charged, it retains its charge during such intervals and the accuracy of the count is not affected by variations in the intervals of recurrence of pulsations from circuit 1.

The pulsation counter is shown as being adjustable over a range of one to fifteen pulsations, but it may be easily altered to extend the range to sixty pulsations without any loss of accuracy.

Since the condenser 47 is charged only during the "off" time of circuit 1, when no line voltage variations are produced by said circuit, the counting circuit is inherently independent of line voltage variations caused by the machine 1.

It should be apparent that the counting circuit of this invention, when used with a seam timer such as that disclosed in my aforesaid copending application, will limit the operation of the seam timer to a predetermined adjustable number of "on" and "off" times; the circuit is independent of the duration of the "on" and "off" times.

The firing point M of tube 50 may, with proper resistance values of the sections of resistor 59, be made to occur at an instant approximately halfway between the ends of any corresponding condenser charging interval, such as the interval $T_4$—$T_5$ illustrated. By so establishing the predetermined firing point, the circuit is made substantially independently of line voltage variations. Even though the line voltage varies somewhat, which would cause the position of the point M to shift in time location, the shift in such location is never great enough, with reasonable variations in line voltage, to cause point M to occur before instant $T_4$ or after instant $T_5$, in the example illustrated. As a result, the circuit will count the proper number of pulsations independently of reasonable variations in line voltage.

Of course, it is to be understood that this invention is not limited to the particular details as described above, as many equivalents will suggest themselves to those skilled in the art. It is accordingly desired that the appended claims be given a broad interpretation commensurate with the scope of this invention within the art

What is claimed is:

1. An impulse counting circuit including, in combination, a source of positive voltage impulses, a source of alternating current, a capacitance, a grid-controlled gaseous discharge rectifier having its anode-cathode path connected in series between said alternating current source and said capacitance, means connecting the grid of said rectifier to said impulse source, whereby said rectifier becomes conductive in response to each of said impulses to connect said capacitance to said alternating current source during substantially a half-cycle of said source of alternating current for each of said impulses to thereby charge said capacitance with a predetermined polarity during each of said connections, means for isolating the charge on said capacitance from the potential across the discharge path of said gaseous discharge rectifier during the periods when no current is flowing in said capacitance, a grid-controlled gaseous discharge device, a source of direct voltage, a predetermined negative potential derived from said source of direct voltage and applied to said last-named grid to prevent conduction in said device, means for applying the charge voltage across said capacitance and said potential in series opposition to said last-named grid, whereby as said capacitance charges the negative potential on said last-named grid is reduced and said device conducts when the resultant potential on said last-named grid reaches a predetermined value, and a control circuit energized by conduction in said device.

2. An impulse counting circuit including, in combination, a source of positive voltage impulses of rather short duration, a source of alternating current, a condenser, a grid-controlled gaseous discharge rectifier having its anode-cathode path connected in series between said alternating current source and said condenser, means connecting the grid and cathode of said rectifier across said impulse source, said last-named means including a resistor and a capacitor connected in parallel across said grid and cathode to function as a memory circuit to thereby increase the effective duration of the impulses applied to said rectifier, whereby said rectifier becomes conductive in response to each of said impulses to connect said condenser to said alternating current source during substantially a full half-cycle of said source of alternating current for each of said impulses to thereby charge said condenser with a predetermined polarity during each of said connections, a grid-controlled gaseous discharge device, a source of direct voltage, a predetermined negative potential provided by said source of direct voltage and applied to said last-named grid to prevent conduction in said device, means for applying the voltage across said condenser and said potential in series opposition to said last-named grid, whereby as said condenser charges the negative potential on said last-named grid is reduced and said device conducts when the resultant potential on said last-named grid reaches a predetermined value.

3. An impulse counting circuit including, in combination, a controllable source of positive voltage impulses, a source of alternating current, a condenser, a grid-controlled gaseous discharge rectifier having its anode-cathode path connected in series between said alternating current source and said condenser, means connecting the grid of said rectifier to said impulse source, whereby said rectifier becomes conductive in response to each of said impulses to connect said condenser to said alternating current source during substantially a half-cycle of said source of alternating current for each of said impulses to thereby charge said condenser with a predetermined polarity during each of said connections, a grid-controlled gaseous discharge device, a predetermined negative potential applied to said last-named grid to prevent conduction in said device, means for applying the charge voltage across said condenser and said potential in series opposition to said last-named grid, whereby as said condenser charges the negative potential on said last-named grid is reduced and said device conducts when the resultant potential on said last-named grid reaches a predetermined value, and means responsive to conduction in said device for controlling said impulse source, said direct voltage source including manually-adjustable means for varying said predetermined negative potential and thereby also the condenser charge voltage necessary to cause said device to conduct.

4. An impulse counting circuit, comprising a source of positive voltage impulses, a source of alternating current, a condenser, a grid-controlled gaseous discharge rectifier, means connecting the anode-cathode path of said rectifier in series with a first resistor and said condenser across said alternating current source, means connecting the grid of said rectifier to said impulse source, whereby said rectifier becomes conductive in response to each of said impulses to connect said condenser to said alternating current source during substantially a half-cycle of said source of alternating current for each of said impulses to thereby charge said condenser with a predetermined polarity during each of said connections, said polarity being such that the charge voltage across said condenser tends to oppose the flow of current from said alternating current source through said rectifier as said condenser becomes charged, a second resistor connected between the cathode and anode of said rectifier to bypass said condenser and allow current to flow through said rectifier throughout said half-cycle, means for isolating the charge on said capacitance from the potential across the discharge path of said gaseous discharge rectifier during the periods when no current is flowing in said capacitance, a grid-controlled gaseous discharge device, a source of direct voltage providing a predetermined negative potential for said last-named grid to prevent conduction in said device, means for applying said charge voltage and said potential in series opposition to said last-named grid, whereby as said condenser charges the negative potential on said last-named grid is reduced and said device conducts when the resultant potential on said last-named grid reaches a predetermined value, and a control circuit energized by conduction in said device, said direct voltage source including manually-adjustable means for varying said predetermined negative potential and thereby also the condenser charge voltage necessary to cause said device to conduct.

5. An impulse counting circuit, comprising a source of positive voltage impulses, a source of alternating current, a condenser, a grid-controlled gaseous discharge rectifier, a circuit connecting the anode-cathode path of said rectifier in series with a first resistor, a unilateral conducting device, and said condenser across said alternating current source, means connecting the grid of said rectifier to said impulse source, whereby said rectifier becomes conductive in response to each of said impulses to connect said condenser to said alternating current source during substantially a half-cycle of said source of alternating current for each of said impulses to thereby charge said condenser with a predetermined polarity during each of said connections, said polarity being such that the charge voltage across said condenser tends to oppose the flow of current from said alternating current source through said rectifier as said condenser becomes charged, a second resistor connected across said first resistor, said device, and said condenser to bypass said condenser and allow current to flow through said rectifier throughout said half-cycle, said device being so poled as to allow said condenser to be charged therethrough but to prevent discharge of said condenser through said two resistors in series, a source of direct voltage supplying a predetermined potential, means connecting said direct voltage source to said condenser in series opposition with said charge voltage, and means responsive to a predetermined small difference between said charge voltage and said predetermined potential for producing a controlling signal.

6. An impulse counting circuit, comprising a controllable source of positive voltage impulses, a source of alternating current, a condenser, a grid-controlled gaseous discharge rectifier, a circuit connecting the anode-cathode path of said rectifier in series with a first resistor and said condenser across said alternating current source, a circuit connecting the grid of said rectifier to said impulse source, whereby said rectifier becomes conductive in response to each of said impulses to connect said condenser to said alternating current source during substantially a half-cycle of said source of alternating current for each of said impulses to thereby charge said condenser with a predetermined polarity during each of said connections, said polarity being such that the charge voltage across said condenser tends to oppose the flow of current from said alternating current source through said rectifier as said condenser becomes charged, a second resistor connected between the cathode and anode of said rectifier to bypass said condenser and allow current to flow through said rectifier throughout said half-cycle, a source of direct voltage supplying a predetermined potential, means connecting said direct voltage source in series opposition with said condenser charge voltage, means responsive to a predetermined small difference between said charge voltage and said predetermined potential for producing a controlling signal, and means for utilizing said signal to control said impulse source.

7. An impulse counting circuit including, in combination, a controllable source of voltage impulses, a source of alternating current, a condenser, a controllable unidirectional discharge device controlled by impulses from said source of voltage impulses, said condenser being connected to said alternating current source through said device during substantially a half cycle of said source of alternating current for each impulse from said source of voltage impulses to thereby charge said condenser with a predetermined polarity during each of said connections, the main discharge path of said device being energized substantially entirely from said source of alternating current, a source of direct voltage supplying a predetermined potential, means connecting said direct voltage source to said condenser in series opposition with the charge voltage across said condenser, means responsive to a predetermined small difference between said charge voltage and said predetermined potential for producing a controlling signal, and means for utilizing said signal to control said impulse source.

DONALD P. FAULK.

REFERENCES CITED

The following references are of record in the file of this patent:

UNITED STATES PATENTS

| Number | Name | Date |
|---|---|---|
| 2,016,147 | La Pierre et al. | Oct. 1, 1935 |
| 2,110,015 | Fitzgerald | Mar. 1, 1938 |
| 2,132,264 | King | Oct. 4, 1938 |
| 2,430,547 | Anderson et al. | Nov. 11, 1947 |
| 2,442,609 | Levoy | June 1, 1948 |
| 2,444,036 | Crost | June 29, 1948 |
| 2,482,561 | Shenk | Sept. 20, 1949 |
| 2,489,824 | Shenk | Nov. 29, 1949 |
| 2,540,524 | Houghton | Feb. 6, 1951 |

FOREIGN PATENTS

| Number | Country | Date |
|---|---|---|
| 514,196 | Great Britain | Nov. 1, 1939 |